(12) United States Patent
Kneeshaw et al.

(10) Patent No.: US 7,980,956 B2
(45) Date of Patent: Jul. 19, 2011

(54) SLEEVE AND SLEEVE-TYPE FLEXIBLE SHAFT COUPLING

(75) Inventors: Jonathan Andrew Kneeshaw, Moffat (GB); John W. Black, Dumfriesshire (GB); Arthur Jack Clarke, Dumfries and Galloway (GB)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 12/637,969

(22) Filed: Dec. 15, 2009

(65) Prior Publication Data

US 2010/0093450 A1    Apr. 15, 2010

Related U.S. Application Data

(63) Continuation of application No. 11/654,087, filed on Jan. 17, 2007, now Pat. No. 7,658,678.

(51) Int. Cl.
*F16D 3/54* (2006.01)
(52) U.S. Cl. .............................. 464/49; 464/88
(58) Field of Classification Search ............... 464/49, 464/88, 93; 474/202–205
See application file for complete search history.

(56) References Cited

U.S. PATENT DOCUMENTS

| | | | |
|---|---|---|---|
| 2,740,271 A | 4/1956 | Beier | |
| 2,924,082 A | 2/1960 | Reich | |
| 3,360,962 A | 1/1968 | Firth | |
| 3,362,191 A | 1/1968 | Louette | |
| 3,888,132 A * | 6/1975 | Russ, Sr. | 474/205 X |
| 4,357,137 A | 11/1982 | Brown | |
| 4,509,936 A * | 4/1985 | Muller | 474/205 X |
| 4,998,906 A * | 3/1991 | Moss | 474/205 X |
| 5,139,460 A | 8/1992 | Hoyt et al. | |
| 5,295,911 A | 3/1994 | Hoyt et al. | |
| 5,660,591 A | 8/1997 | Reynolds | |
| 6,142,878 A | 11/2000 | Barin | |
| 6,283,868 B1 | 9/2001 | Clarke et al. | |
| 6,342,011 B1 | 1/2002 | Pokrandt et al. | |
| 6,671,475 B2 | 12/2003 | Katada et al. | |
| 2005/0260375 A1 | 11/2005 | Clarke et al. | |

FOREIGN PATENT DOCUMENTS

JP    07-259876 A    10/1995

* cited by examiner

*Primary Examiner* — Greg Binda
(74) *Attorney, Agent, or Firm* — P. N. Dunlap, Esq.; J. A. Thurnau, Esq.; T. A. Dougherty, Esq.

(57) ABSTRACT

A shaft coupling with a flexible annular sleeve, a driver end piece, and a driven end piece. The end pieces have a plurality of axially projecting prongs arranged so that the driver prongs loosely interlock in the spaces between the driven prongs with a gap between each pair of prongs. The sleeve fits snugly around the periphery of the loosely interlocked prongs. Each prong has at least one prong groove in its outer periphery. Each of two peripheral edges may be shaped to form a groove flank, and each set of two adjacent groove flanks on adjacent prongs may form a gap groove. The sleeve has a plurality of inner teeth including a plurality of groove teeth in alternating arrangement with a plurality of gap teeth. The prong grooves and groove teeth mesh, and the gap grooves and gap teeth mesh. Groove teeth may be bigger than gap teeth.

7 Claims, 7 Drawing Sheets

SLEEVE AND SLEEVE-TYPE FLEXIBLE SHAFT COUPLING

CROSS REFERENCE TO RELATED APPLICATIONS

This application is a continuation of U.S. patent application Ser. No. 11/654,087 filed Jan. 17, 2007, now U.S. Pat. No. 7,658,678.

BACKGROUND OF THE INVENTION

1. Field of the Invention

This invention relates generally to a sleeve for a sleeve-type flexible coupling for transmitting power between rotating shafts, more particularly for a sleeve-type flexible coupling having pronged, interlocking hubs, and specifically to an elastomeric sleeve with two tooth types.

2. Description of the Prior Art

Transferring power or rotational motion through flexible, elastomeric, sleeve-type, shaft couplings of various kinds is known. Examples of the kind of coupling design that relies on the shear strength of the sleeve are U.S. Pat. No. 6,283,868 and U.S. Pat. No. 6,142,878. Shear-type sleeve couplings generally have a pair of opposing hubs or end pieces adapted to attach to two coaxial shafts, and a connecting sleeve extending between and engaging the two hubs. The hubs and sleeves engage via a plurality of axially extending ribs or teeth along at least a portion of the inner periphery of the sleeve for meshing with grooves in oppositely disposed end pieces to form a flexible coupling assembly. These couplings generally provide some vibration isolation and accommodate some shaft misalignment.

Problems with these flexible sleeve couplings include that elastomer teeth can shear off under a torsional load, the sleeve itself can shear into two pieces in the area intermediate between the two engaged ends, and the sleeve can expand or explode at high speed from centrifugal force. Methods to improve tooth shear resistance include reinforcing the elastomer of the sleeve with chopped or continuous fibers, using higher strength plastics, composites or elastomers, or reinforcing the teeth with fabric. Methods to protect the sleeve from centrifugal forces include reinforcing the sleeve with tensile cords, providing the hubs with an annular cavity into which the sleeve engages as disclosed in U.S. Pat. No. 5,660,591 and providing an external metal band as disclosed in U.S. Pat. No. 3,362,191. Methods to prevent the sleeve from twisting and or shearing between the hubs include using one inner male hub and one outer female hub with the annular sleeve engaged there between as disclosed in U.S. Pat. No. 4,357,137, thickening the intermediate region of the sleeve as disclosed in U.S. Pat. No. 6,671,475, or using hubs with radially overlapping teeth or prongs as disclosed in U.S. Pat. No. 5,295,911. Typical commercial sleeves are thus relatively thick and bulky. These shear-type coupling designs provide machinery protection by failure of the elastomer sleeve under excessive torque, although sometimes fail-safe operation is more desirable.

One fail-safe design uses hubs which have circumferentially overlapping teeth or prongs with large gaps between the teeth into which gaps an elastomeric element is inserted. During operation, the elastomeric element resides in compression between driver and driven teeth, so high loads are possible. If the elastomer fails, the overlapped teeth continue to drive the load. Another method to provide fail-safe transmission of power on failure of the elastomer is to provide a rigid engaging element which may be metal coated with elastomer as disclosed in U.S. Pat. No. 5,660,591. Because the elastomer layer is so thin, this fail-safe coupling provides very little flexibility and very little vibration isolation.

A pronged coupling having a flexible sleeve with internal teeth has been proposed in U.S. Pat. No. 3,360,962 and Japanese Unexamined Patent Publication 07-259876A. Each prong has a series of grooves which mesh with the teeth in the sleeve. During operation the elastomeric element resides in tension between a driver and a driven prong. Fail-safe operation is provided in the event of sleeve failure. While various embodiments are suggested, it is not known or taught how to combine the advantages of tension-type operation with the advantages of compression-type operation to achieve increased durability, increased torque rating, and/or decreased coupling size with less material usage.

Thus, the prior art fails to disclose a pronged coupling having a reinforced elastomeric sleeve with teeth that mesh with gaps between and grooves on interlocking prongs. The prior art fails to disclose a coupling sleeve with a dual-tooth profile.

SUMMARY

The present invention is directed to systems and methods which provide a flexible shaft coupling with excellent torsional load capacity, fail-safe operation, and torsional vibration damping, all in a compact package.

The present invention is directed to a shaft coupling with a flexible annular sleeve, a driver end piece, and a driven end piece. Each of the end pieces may connect to a shaft for transmitting motion and/or force from one shaft to another. The end pieces have a plurality of axially projecting prongs arranged so that the driver prongs fit into, or interlock loosely in, the spaces between the driven prongs with a gap between each pair of prongs. The sleeve fits snugly around the periphery of the loosely interlocked prongs. Each prong has at least one prong groove in its outer periphery. Either or both of two peripheral edges may be shaped to form a groove flank, and each set of two adjacent groove flanks on adjacent prongs may form a gap groove. The sleeve has a plurality of inner teeth including a plurality of groove teeth and a plurality of gap teeth. The prong grooves and groove teeth mesh, and the gap grooves and gap teeth mesh. The number of grooves on each prong may be one, two, or more.

The invention is also directed to a flexible sleeve for a shaft coupling having groove teeth of a different size from the gap teeth. The groove teeth may be larger than the gap teeth. The tooth pitch may be constant. A certain number of groove teeth may alternate with a single gap tooth. That number may be one, two, or more.

Embodiments of the invention may have from two to sixty-four prongs on each end piece, or from four to twelve prongs on each end piece. The prongs may project from a circular end face of a generally cylindrical support, or the prongs may be attached to the outer cylindrical surface of such a support.

In one embodiment of the invention, the gaps or spaces between loosely fitted prongs comprise in the range of from about 15% to about 20% of the periphery of the interlocked prongs. In other embodiments, the gaps may comprise from about 5% to about 50%, or from about 10% to about 30% of the total periphery of the interlocked prongs.

In other embodiments of the invention, the flexible sleeve may have an annular elastomeric or plastic body, and at least one of a layer of fabric on the toothed inner surface, fabric on the back surface, fiber loaded material in the body, and tensile cords or fabric embedded in the body. The elastomeric body may be made of rubber, plastic, or the like, or combinations thereof. The sleeve may be a plurality of sleeve sections arranged side-by-side axially about the interlocked prongs of the end pieces. The sleeve may also be of a single elastomeric material and may have no fiber reinforcement.

The invention is also directed to a pronged shaft coupling with locator tabs on the ends of the prongs to facilitate blind assembly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
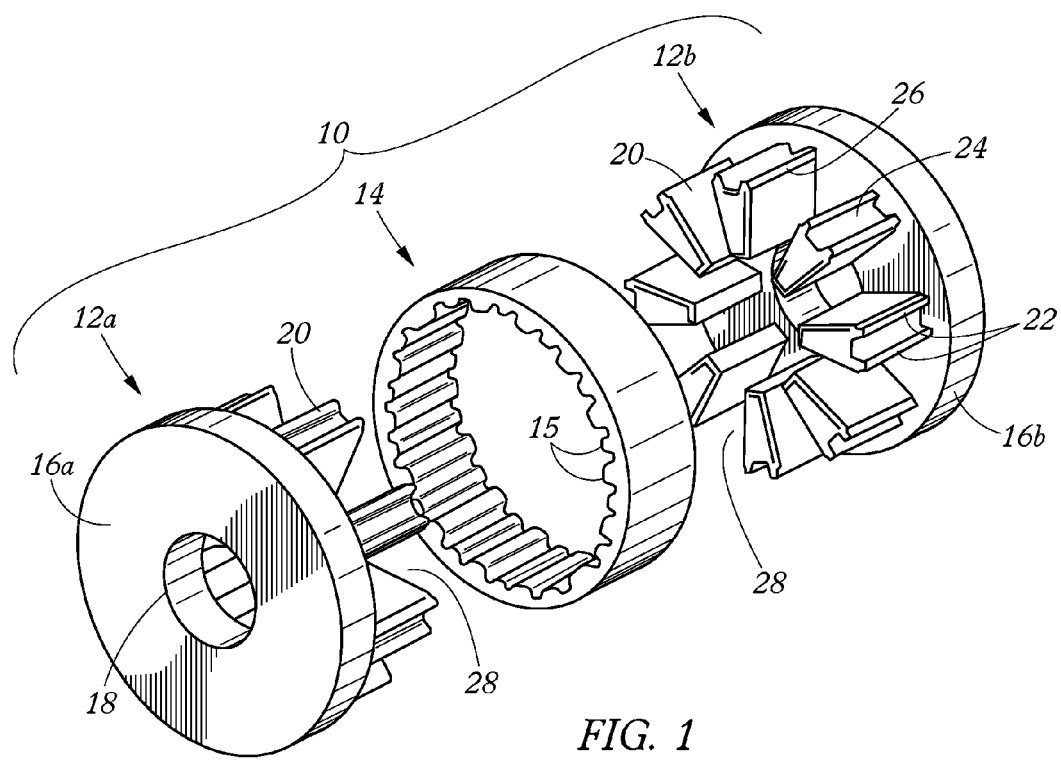
FIG. 1 is an exploded perspective view of one embodiment of the invention.

An exploded perspective view of one embodiment of the invention is shown in FIG. 1. In FIG. 1, shaft coupling 10 has two end pieces 12a and 12b and flexible annular sleeve 14. Sleeve 14 has a plurality of teeth 15 protruding radially inward from the inner surface of the sleeve and extending axially along the width of the sleeve. Teeth 15 may be uniform or may have two or more different sizes and/or shapes. Each end piece 12a and 12b has a plurality of prongs 20 attached to and projecting from respective end support 16a and 16b. In the embodiment of FIG. 1, there are eight prongs 20 on each end piece. Each end support may be adapted to engage a shaft (or other functionally equivalent rotating member or device hereinafter referred to as "shaft"), not shown, by means such as hole 18.

In the embodiment of FIG. 1, each prong 20 has two ridges 22 extending axially along the length of the outer periphery of the prong. Each prong 20 therefore has a prong groove 24 in the outer periphery of the prong and extending axially along the length of the prong. The outer periphery of prong 20 may have shaped edges 26, which also form the outer flanks of ridges 22. Although a single groove per prong is preferred for maximum load capacity, embodiments having two or more grooves per prong are also contemplated. Thus, in other embodiments, each prong may have three or more ridges 22, with two or more prong grooves there between, and the sleeve may have a corresponding number of groove teeth alternating with a single gap tooth.

Figure 2:
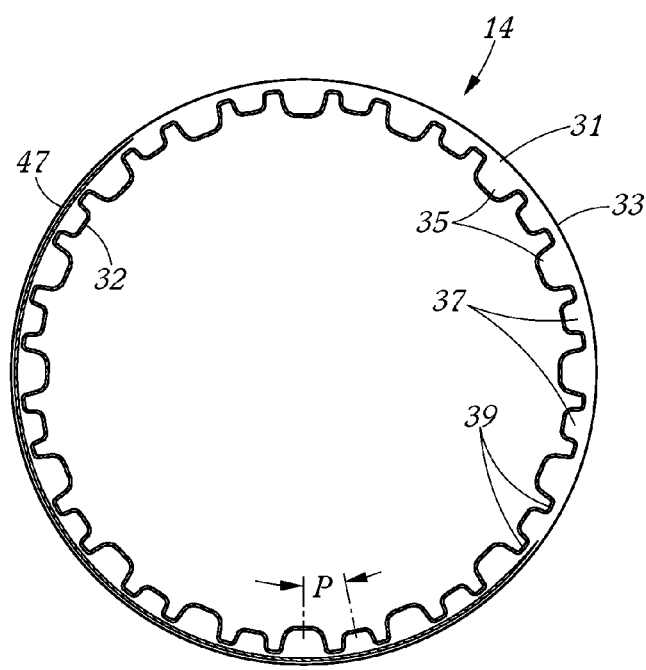
FIG. 2 is a front elevation of a sleeve embodiment of the invention.

When the coupling of FIG. 1 is assembled, prongs 20 of an end piece fit loosely into spaces 28 between the prongs of an opposing end piece, and sleeve 14 fits snuggly about the loosely interlocked prongs. A gap remains between each adjacent pair of interlocked prongs. As FIG. 2 shows more clearly, sleeve 14 may have two kinds of teeth 15: groove teeth 35 and gap teeth 37 in alternating arrangement. The ratio of groove teeth to gap teeth is equal to the number of grooves on each prong. Thus, the number of groove teeth alternating with or lying between the individual gap teeth is equal to the number of grooves per prong. Gap teeth 37 mesh with the gaps between the prongs, while groove teeth 35 mesh with prong grooves 24. Prong ridges 22 thus mesh with sleeve grooves 39, which are also known as land areas 39. Tooth pitch P of sleeve 14 is the circumferential distance from the tip of a groove tooth 35 to the tip of a neighboring gap tooth 37. Pitch is measured at the outside diameter of the end pieces.

The sleeve embodiment 14 of FIG. 2 illustrates that the inventive sleeve may have body 31 which may be formed of a resilient or elastomeric material. A sleeve body material may be for example rubber, plastic, thermoplastic elastomer ("TPE"), thermoplastic urethane ("TPU"), or thermoplastic vulcanizate ("TPV"), or the like. The sleeve may comprise a single homogeneous material, or the elastomeric material may be compounded with fillers, short fibers, extenders, plasticizers, antioxidants, antiozonants, process aids, curatives, accelerators, coagents, and the like. Materials such as elastomer compositions and textile reinforcements known from the art of toothed power transmission belts may advantageously be used in the sleeve. Thus, for example, the tooth side 32 and/or the backside 33 may have a textile or fabric, woven or nonwoven, layer for tooth reinforcement and/or abrasion resistance. Useful fabric materials include for example cotton, nylon, polyester, acrylic, aramid, polyketones, and other synthetic and natural fibers. Body 31 may have embedded therein a layer of textile or fabric reinforcement, such as a spiraled tensile cord 47 which may be of glass, aramid, carbon, PBO, polyester, rayon, acrylic, nylon, vinylon, metal, or other fiber or yarn, or hybrids thereof. The textile reinforcements may be adhesively treated for bonding to the elastomeric material of the sleeve body. Various useful sleeve materials and constructions, as well as tooth profiles, are described in U.S. Pat. No. 6,283,868, the contents of which are hereby incorporated herein by reference. Other useful sleeve materials and constructions, primarily based on polyurethane, are described in U.S. Pat. Publication No. 2005/260375A1, the contents of which are hereby incorporated herein by reference.

The end pieces of the coupling may generally be of a tough, rigid material such as a metal or a composite, and may be formed by any suitable process. The means of attaching an end piece to a shaft is not limited, but may be a keyway, axial hole, threads, interference fit, set screw, flange, bolts, clamp, tapered bush, or the like, or combinations thereof. The two end pieces may use different means of attachment to their respective shafts or rotating devices, depending on the need of the application. The two end pieces may moreover have different details with respect to flanges, support elements, and the like, as long as the essential features required to interlock with each other and mesh with the flexible sleeve are present.

Figure 12:
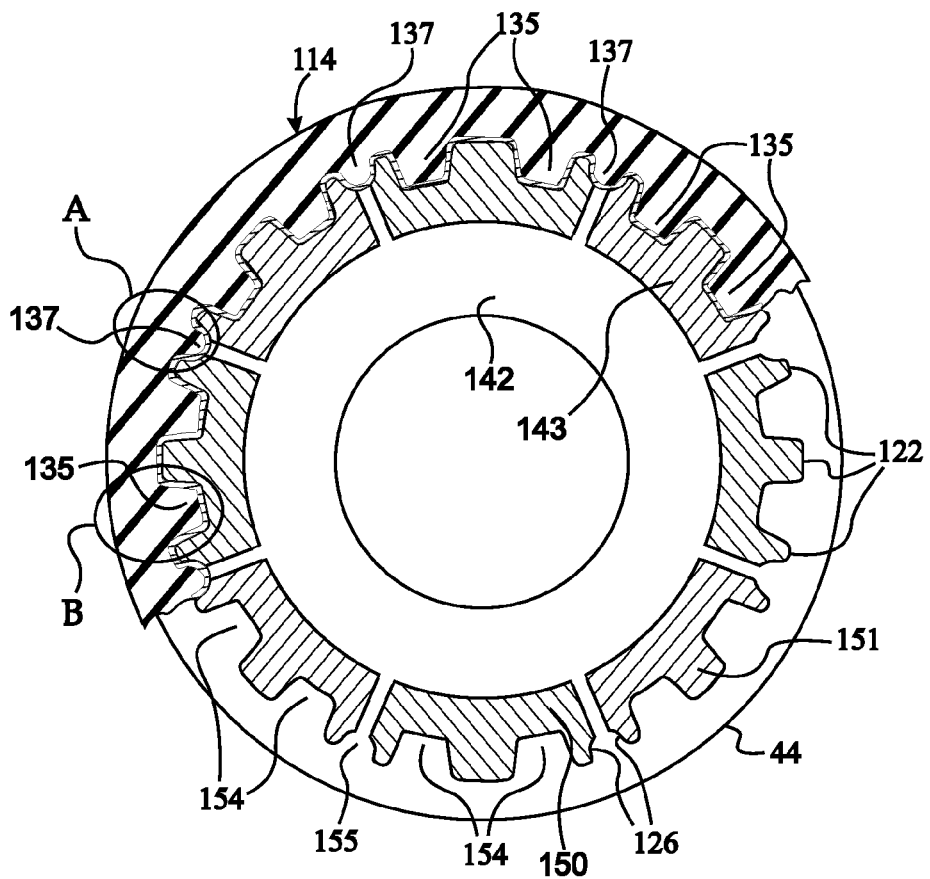
FIG. 12 is a partially fragmented cross-sectional view of an embodiment of the invention.
Figure 13:
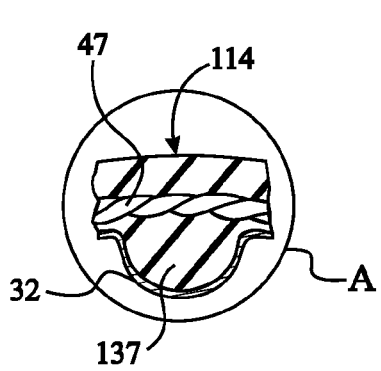
FIG. 13 is an enlarged fragmented view of a sleeve, gap tooth from the embodiment of FIG. 12 at A.
Figure 14:
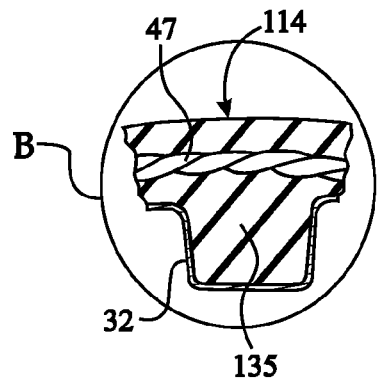
FIG. 14 is an enlarged fragmented view of another sleeve, groove tooth from the embodiment of FIG. 12 at B.

FIG. 12 shows a partially fragmented cross-sectional view of a coupling assembly having four prongs 150 on one end piece 142 and four prongs 151 on the other end piece 143. In addition, the embodiment of FIG. 12 has two prong grooves 154 per prong, resulting in three ridges 122 on each prong. Sleeve 114 has two kinds of teeth: groove teeth 135 and gap teeth 137 in alternating arrangement. The ratio of groove teeth to gap teeth is equal to the number of grooves on each prong, namely 2:1. Thus, the number of groove teeth alternating with or lying between the individual gap teeth is equal to the number of grooves per prong, namely two. The edges of the outer periphery of the prongs have shaped edges 126, which also form the outer flanks of the outer ridges 122 and gap grooves 155. Gap teeth 137 mesh with gap grooves 155 between the prongs, while groove teeth 135 mesh with prong grooves 154. Prong ridges 122 thus mesh with sleeve grooves. In FIG. 13, an enlarged view at "A" of one gap tooth 137 better shows the gap tooth profile, which is a curvilinear tooth profile, with tooth reinforcement layer on tooth side 32 and spiraled tensile cord 47. In FIG. 14, an enlarged view at "B" of one groove tooth 135 better shows the groove tooth profile, which is a trapezoidal tooth profile.

Figure 3:
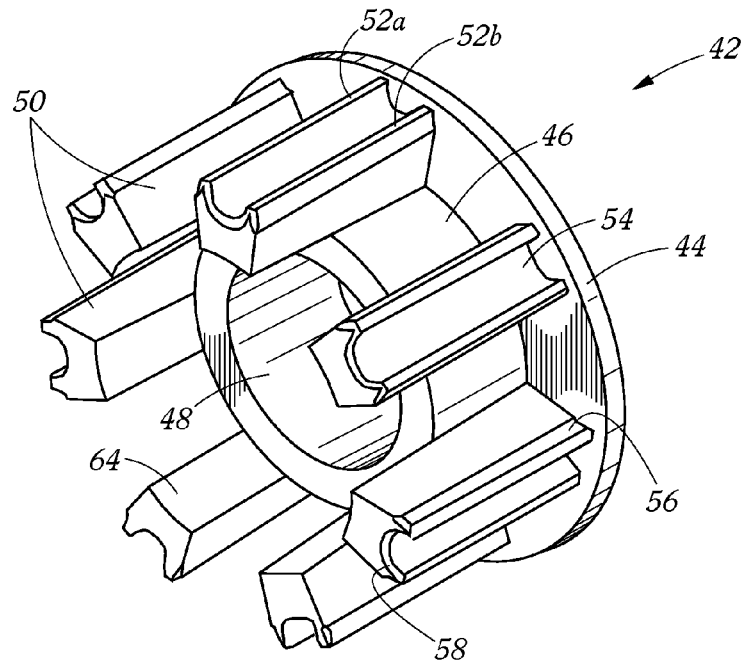
FIG. 3 is a perspective view of an end piece according to an embodiment of the invention.
Figure 4:
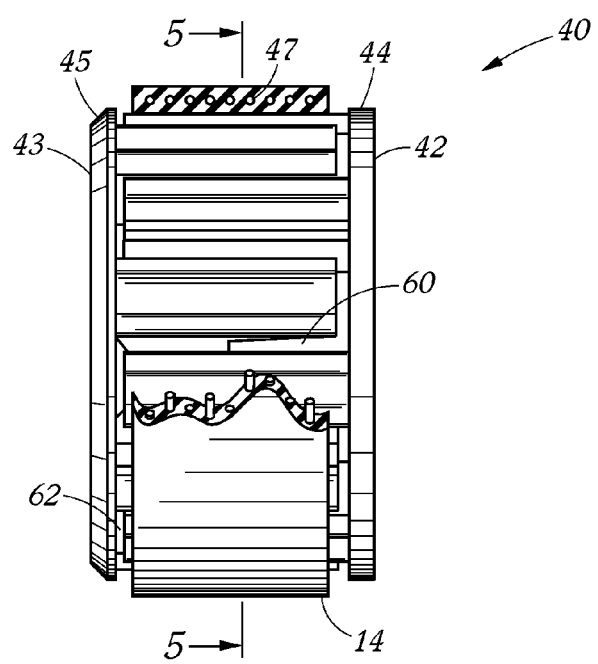
FIG. 4 is a side elevation of the end piece of FIG. 3 assembled with a second end piece and a sleeve, shown partially cut away, according to another embodiment of the invention.
Figure 5:
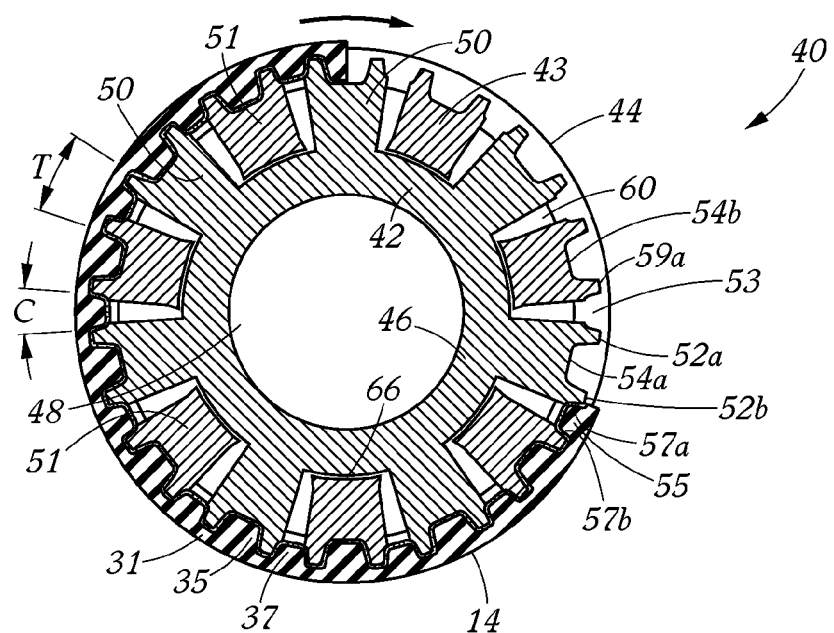
FIG. 5 is a cross-sectional view of the assembly of FIG. 4.

A second embodiment of the invention, having a different prong support arrangement, is shown in FIGS. 3-5. While the first embodiment had an end piece with a large disk-like support 16a with the prongs projecting from a circular face thereof, the second embodiment has an end piece 42 having a cylindrical support 46 with prongs 50 attached to the outer cylindrical surface thereof. About half of the prong's inner periphery or bottom surface 64 projects beyond support 46, while the other half of the prong is attached to support 46. Thus, the prongs of the second embodiment may be significantly stiffer and/or stronger than the fully projecting prongs of the first embodiment. Alternately, this second embodiment could be modified to provide more, smaller prongs of similar strength or stiffness to those of the first embodiment. FIG. 4 shows coupling 40 having two end pieces 42 and 43 assembled with flexible sleeve 14 installed around the prongs. Sleeve 14 is shown partially cut away in order to more clearly illustrate reinforcing cord 47 embedded in sleeve 14 and prong gap 60 between loosely interlocked prongs. Optional flange 44 and/or 45 may be used to prevent axial movement of the sleeve. Cylindrical support 46 has hole 48, which is illustrative of various means of attachment to a shaft that may be incorporated into the end piece. The end piece 42 shown in FIG. 3 has seven prongs 50, each similar to the eight prongs of end piece 12 of FIG. 1. The free ends of prongs 50 may have bevels 58, at least on the edges having the tooth/groove profile, to facilitate assembly of the sleeve onto the end piece and to minimize damage to the sleeve which might occur if a sharp edge were present on the end of the prong. As in the first embodiment, prongs 50 have teeth 52a and 52b, axial groove 54, and shaped edges 56.

The invention provides for coupling of two shafts which have some degree of misalignment. Gaps 60 between prongs and the flexible nature of the sleeve permit accommodation of angular shaft misalignment or radial shaft misalignment. Base gaps 66, shown in FIG. 5, and end gap 62, shown in FIG. 4, are also necessary for accommodating misalignment. The larger are gaps 60, 62 and 66, the more tolerance the coupling has to shaft misalignment. Gaps 60 between prongs require the most consideration because they also may affect the design and/or meshing of the gap teeth on the sleeve. In the drawings, for example, gaps 60 between prongs are approximately 15 to 20% of the total periphery of the interlocking prong section. Gaps 60 may advantageously be from about 5% to about 50%, or from about 10% to about 30% of the total periphery of the prongs. The coupling can also accommodate axial shaft displacement because of the ability of end gap 62 to vary. The sleeve may extend from one flange 44 to the other flange 45, including touching one or both flanges, as shown in FIG. 4, thus positively maintaining end gap 62 during assembly and/or operation of the coupling.

The invention also provides resistance to high loads or torques. The operation of the coupling in transmitting loads or motion from one shaft to another may be described as a combination of tension and compression in various sections of the sleeve. The coupling process may be described in more detail with reference to the cross-sectional view in FIG. 5 of coupling 40. For the sake of discussion, end piece 42 will be presumed to be attached to a driver shaft or device (not shown), and end piece 43 will be presumed attached to a driven shaft or device (not shown). Thus, the prongs 50 of the end piece 42 are driver prongs, and the prongs 51 of end piece 43 are driven prongs. A direction of rotation is indicated by the large arrow. A tension section of the coupling sleeve, labeled approximately as region T, arises as follows. Driver prongs 50, through trailing prong teeth 52a, exert force on a groove tooth (such as tooth 35 of sleeve 14) which is meshed in driver prong groove 54a. Thus, the groove teeth 35 of the sleeve experience shear forces. The tooth shear force is then transmitted from the tooth to the sleeve body 31 and tensile cord if present, creating a tensile force in the sleeve body at least in the tension section 53 located between driver prong tooth 52a and driven prong tooth 59a. The tension is then transmitted through tooth shear forces from the sleeve tooth meshed in driven prong groove 54b to driven prong tooth 59a. With respect to the direction of rotation, the trailing sections of sleeve which span the gaps between each driver prong and the driven prong behind it will be in tension as the driver pulls on the driven. Thus, the total torsional load is divided among the tension sections T, and the number of tension sections equals the number of prongs on an end piece. This tensile load sharing is most effective when the number of prongs is maximized. The tooth shear capacity of the sleeve is maximized when the groove teeth are as large as practical. Thus, it is generally preferred to have a single large groove on each prong, although other numbers of grooves may be used, such as two, or from three to nine.

A compression section of the coupling sleeve, labeled approximately as region C in FIG. 5, arises as follows. The leading edge 57a of leading driver prong tooth 52b pushes on the trailing edge of a gap tooth (such as tooth 37 of sleeve 14) which is meshed in gap groove 55. Thus, each section of sleeve which spans a gap between a driver prong and the driven prong ahead of it will be in compression as the driver pushes on the driven. Thus, every other gap tooth 37 will be compressed between the leading flank 57a of a driver prong 50 and the trailing flank 57b of a driven prong 51. Thus, the torsional loads are also divided among the compression sections C, and the number of compression sections equals the number of prongs on an end piece. Since materials used in gap teeth of flexible sleeves, such as rubber, are generally stronger in compression than in tension, and since the gap teeth which reside in the tension sections play little or no role in carrying load, gap teeth 37 need not be as large as groove teeth 35. Thus, it is generally preferred to have gap teeth which are smaller in size than groove teeth, or as small as practical.

The load capacity of the coupling sleeve is maximized when the sleeve and end pieces have as many tension and compression sections as reasonably will fit within the general spatial limitations of the coupling design. The total tensile load is shared approximately equally by each tension section, i.e. the actual tensile load carried by each tensile section is at most the total load divided by the number of prongs in an end piece. The tensile load is further reduced by the amount of load shared by the gap teeth which are in compression. In addition, the load capacity is optimized when the groove teeth are made as large as possible to minimize the effect of shear forces on the groove teeth. Gap teeth may be smaller than groove teeth, because gap teeth are in compression rather than shear, and generally, flexible materials deform less and withstand higher loads in compression than in shear. Thus, a very large diameter coupling, with many prongs and with dual-tooth profiles, can transmit a very high torque. For a given torque requirement, a much smaller package size than prior art sleeve couplings is possible. It should also be noted that the loads are distributed over the entire width of the sleeve. Thus, increasing prong length and sleeve width directly increases the load capacity of the coupling. In prior art shear-type sleeves, the torsional load is concentrated in a relatively narrow band near the center of the sleeve's width, leading to ineffective use of the entire width of the sleeve.

The invention provides good vibration damping of torsional shaft vibrations. The amount of damping depends on the materials used in the sleeve. It has been found that the damping level can be as good as prior art couplings having much thicker sleeves, more material usage, and/or bigger package size. It is believed that the distribution of torsional loads through all the groove teeth (which are in shear) and half of the gap teeth (which are in compression), over the entire width of a sleeve, especially with a dual-tooth profile, maximizes the damping effect of the sleeve tooth material.

The invention provides for fail-safe operation in the event of sleeve failure. The prongs will interfere and drive the coupling. A noise may result, which also provides an audible warning that service is needed.

The coupling may be designed in a wide range of sizes to accommodate a wide range of applications with a wide range of demands. Generally the larger the coupling, the more prongs it should have and the greater will be the load capacity. Diameters of couplings may range for example from less than 4 mm to greater than 1 m. The end pieces of the invention may have any number of prongs more than one. For example, the end pieces may each have from 2 to 64 prongs, or from 3 to 40, or from 4 to 12 prongs. The more prongs on the end pieces, the more tensile load sharing in the sleeve reinforcement, and the higher the load capacity of the sleeve. However, marginal benefits of adding one more prong decrease as the number increases, and manufacturing expense may increase. The most advantageous number of prongs is thus dependent on the diameter of the sleeve or coupling and the desired tooth dimensions. A convenient and useful design approach is to choose the tooth pitch of the sleeve as a multiple of pi ("$\pi$" or 3.142) in mm units. Then the number of teeth in the sleeve will be an integer, and the number of teeth will increase with the diameter of the coupling. For any given size of coupling, there will be a fairly broad practical range of pitches the designer may choose from. As a result, there will also be a fairly broad range of number of teeth on the sleeve which may result, and/or a broad range of number of prongs. Furthermore, the number of sleeve teeth in mesh on each prong may be chosen within a fairly broad range, for example a range of from one to about nine, or from one to two. Furthermore, various tooth profiles and/or combinations of profiles for the groove and/or gap teeth may be advantageously chosen. Thus, a large number of possible variations of coupling designs may be considered to be within the scope of the invention.

Figure 6:
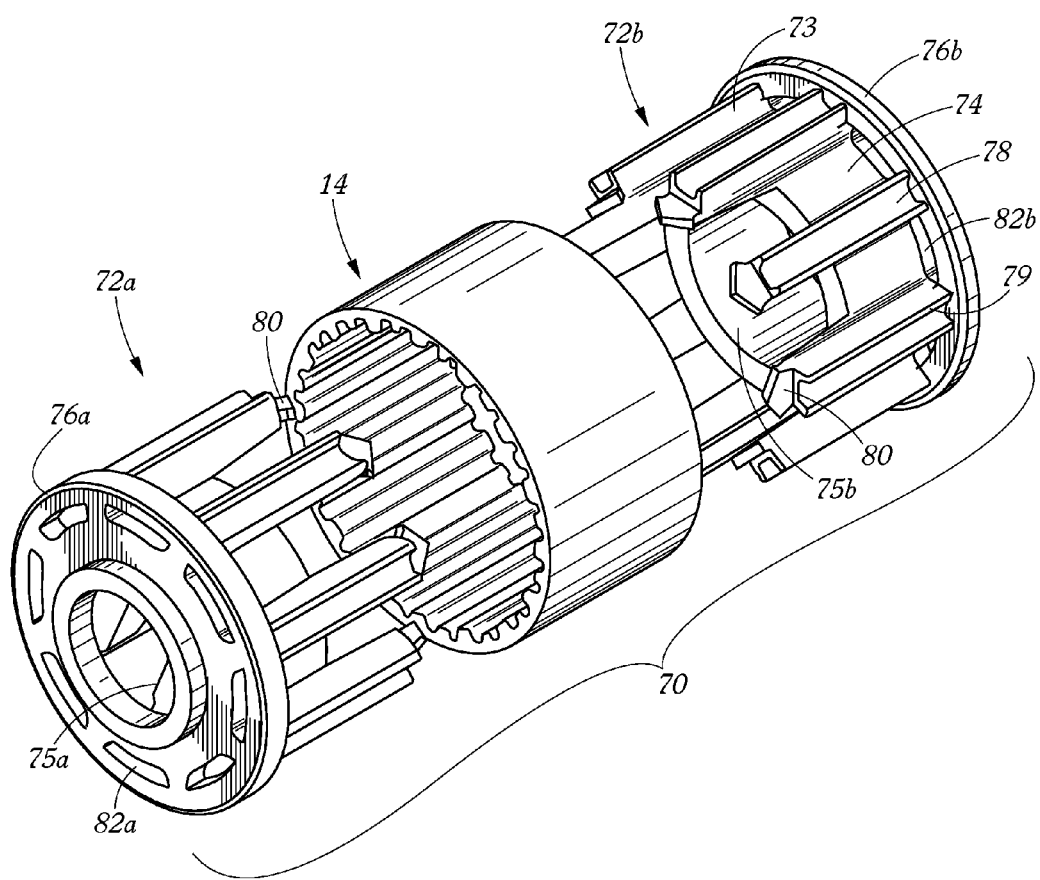
FIG. 6 is an exploded perspective view of yet another embodiment of the invention.

FIG. 6 shows a third embodiment of the coupling 70, having a prong locater tab 80 on the free end of each prong 73. The prong locater tabs 80 enable accurate assembly of the coupling device in the absence of visual input. Blind assembly may be necessary, for example, when the coupling is used in certain hard-to-reach positions on automobile engines. In FIG. 6, prongs are attached to the outer surface of the support 74, as in the second embodiment above. Optional flanges 76a and 76b are provided with slots 82a and 82b to accommodate the locator tabs when the coupling is fully assembled. As in previous embodiments, the end pieces 72a and 72b have a plurality of prongs 73, each having a groove 78 between two teeth 79, which mesh with sleeve 14.

Figure 7:
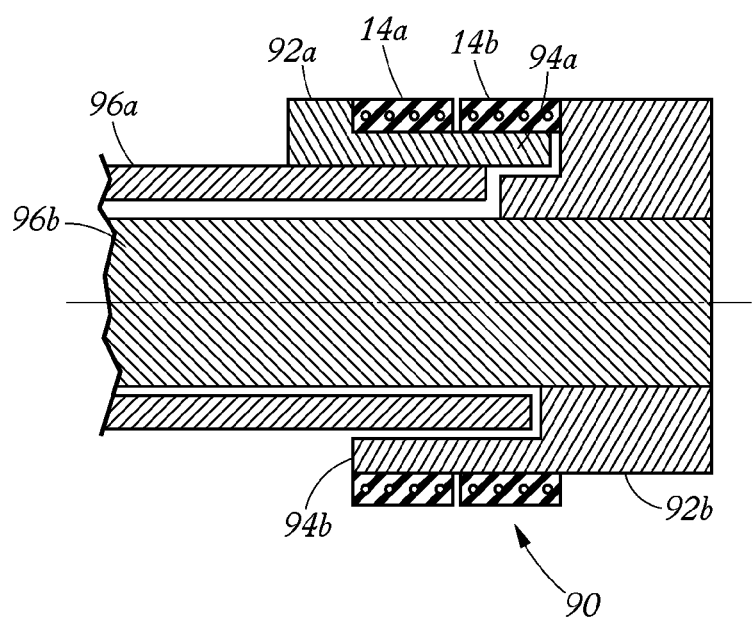
FIG. 7 is a cross-sectional schematic of yet another embodiment of the invention.

FIG. 7 shows a fourth embodiment of the coupling 90, having a different arrangement for shaft attachment wherein both shafts 96a and 96b connect from the same direction. End piece 92a, having prongs 94a, is attached to hollow shaft 96a in the manner of previous embodiments. End piece 92b, having prongs 94b, is attached to solid shaft 96b, which projects from hollow shaft 96a. The prongs of the two end pieces interlock loosely in the manner of previous embodiments.

FIG. 7 also illustrates that two narrower sleeves 14a and 14b may be used instead of one wide sleeve. More than two narrower width sleeves may be used. This would not be possible with a shear-type sleeve coupling, but with a tension-type sleeve coupling, the tensile load capability is relatively independent of the fact two or more smaller sleeves have been combined to reach a given total sleeve width. The loads are still effectively distributed across the entire combined width of the two or more sleeves. While FIG. 7 shows a coupling with two sleeves installed side by side, it should be understood that any of the other embodiments discussed herein or illustrated in other figures could have two or more sleeves installed side by side just as in FIG. 7, and the embodiment of FIG. 7 could have a single sleeve as illustrated by the embodiments in other figures. Likewise, features such as locator tabs, reinforcing cord, dual-tooth profiles, gap grooves, certain prong numbers and so forth which may be shown in the embodiments of one or more figures may be utilized in other embodiments or combinations than those illustrated.

To assure a snug fit between a flexible sleeve and two end pieces, the sleeve may be built up on a mold having the same dimensions and profile as the surface presented by interlocked prongs, but without the gap between prongs. The optional fabric, the body elastomer, and/or tensile cord may be applied to a mold according to known methods of sleeve making The sleeve may be cured on the mold under pressure, as for rubber, or cooled as for thermoplastic. In either case, the natural shrinkage after removing from the mold and cooling will assure a snug fit on the end pieces.

Examples

Comparative sleeve couplings were built according to U.S. Pat. No. 6,283,868. Comparative examples ("Comp. Ex.") 1 and 4 utilize a polychloroprene ("CR") rubber composition in the sleeve body, while the other examples utilize a hydrogenated nitrile rubber ("HNBR") composition in the sleeve body. Inventive Examples ("Ex.") were built according to the present invention using similar HNBR materials as the comparative examples with. All examples contain a helically wound tensile cord of RFL-treated fiberglass with a rubber cement overcoat for adhesion. All examples also contain a rubberized nylon fabric or "jacket" on the sleeve tooth surface for enhanced stiffness and abrasion resistance. In Table 1, samples representing an embodiment of the present invention are called "Examples" and, samples representing the prior art are called "Comparative Examples".

Figure 8:
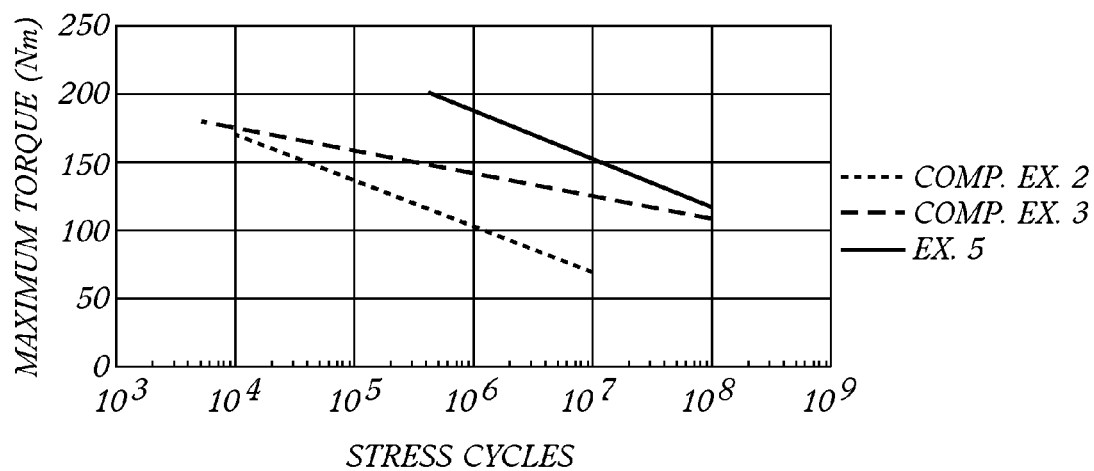
FIG. 8 is a graph of a load capacity performance characteristic of an embodiment of the invention.

To illustrate the increased operating load capacity that can be expected from a flexible coupling of the present invention, a load capacity analysis was performed on samples of flexible coupling devices of the present invention and samples representing the prior art. The load capacity test is carried out by mounting a coupling to be tested between a driver shaft which oscillates rotationally clockwise and counterclockwise over a ±15-degree arc and a driven shaft having a predetermined torque load. The load capacity is determined by the failure torque corresponding to a specified number of cycles. This test was carried out for Comparative Examples 2 and 3 and inventive Example 5. From various data points, for each coupling a load-life line was determined by least squares and the results plotted in FIG. 8. Inventive Example 5 exhibits a significantly higher load-life characteristic than the prior art couplings, even though the sleeve width of Ex. 5 is only about half as wide as the prior art, the outside diameter is comparable to the prior art couplings, and the sleeve thickness is half or less than the prior art. It should be understood that the sleeve thickness is about half the difference between the sleeve outside diameter ("OD") and the end piece OD. Thus, the inventive coupling provides significantly higher torque capacity in a significantly smaller package size than prior art couplings.

The load capacity of the inventive couplings may also be characterized by the methods and principles set forth in Deutsch Industrie Norm ("DIN") 740. The results are set forth below in Table 1 in terms of "nominal torque" and "peak torque" ratings in units of Newton-meters (Nm). The increased load capacity that can be expected from a flexible coupling according to the present invention having comparable end piece OD as a prior art coupling, but about half the width, may be seen by comparing Comp. Ex. 1-3 with Ex. 5, or by comparing Comp. Ex. 4 with Ex. 6. The increased load capacity that can be expected from a flexible coupling according to the present invention having comparable width as a prior art coupling, and somewhat bigger OD, may be seen by comparing Comp. Ex. 4 with Ex. 7.

Torsional stiffness and static damping of the inventive couplings were tested on a torsional stiffness hysteresis test. The stiffness and damping results are presented in Table 1 for Comp. Ex. 1 and 3, and Ex. 5-12. Stiffness of the inventive coupling increases with width, as shown by the results for Ex. 8-11. Comparing Comp. Ex. 3 and Ex. 5 shows that stiffness of an inventive coupling is much higher than for a prior art sleeve coupling of similar torque rating, similar diameter, but much greater width. This higher stiffness reflects the high tensile stiffness of the glass reinforcing cord which comes into play in each tension section of the sleeve.

Damping, on the other hand, shows very little dependence on width. The range and amount of damping exhibited by the inventive coupling examples in Table 1 is very comparable to the amount of damping exhibited by the prior art couplings of Table 1. Though the damping capability is similar to the prior art, it should be noted that the inventive dampers achieve this damping with significantly less material in the sleeve than the prior art.

The characteristics of high stiffness, excellent damping, and snug fitting sleeve contribute to give the coupling very little backlash.

TABLE 1

| | Comp. Ex. 1 | Comp. Ex. 2 | Comp. Ex. 3 | Comp. Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Pitch (mm) | — | — | — | — | 2π | 1.5π | 1.5π | — | — | — | — | — |
| Prongs/end piece | — | — | — | — | 8 | 6 | 8 | 3 | 3 | 3 | 3 | 3 |
| Teeth on Sleeve | 18 | 18 | 18 | 14 | 32 | 24 | 32 | 18 | 18 | 18 | 18 | 18 |
| End Piece O.D. (mm) | 62 | 62 | 62 | 36 | 64 | 36 | 47.4 | 66 | 66 | 66 | 66 | 66 |
| Sleeve O.D. (mm) | 78 | 70 | 78 | 46 | 68 | 38.7 | 50.05 | 66 | 66 | 66 | 66 | 66 |
| Sleeve Width (mm) | 38 | 35 | 35 | 28 | 18 | 11.5 | 28.75 | 12 | 18 | 25 | 38 | 38 |
| Sleeve Material type | CR | HNBR | HNBR | CR | HNBR | HNBR | HNBR | HNBR | HNBR | HNBR | HNBR | HNBR |
| End Piece Material type | Steel | Steel | Steel | Steel | Steel | Steel | Steel | Steel | Steel | Steel | Steel | Aluminum |
| Nominal Torque (Nm) | 70 | 80 | 125 | 18 | 150 | 30 | 95 | — | — | — | — | — |
| Peak Torque (Nm) | 110 | 140 | 160 | 30 | 220 | 58 | 184 | — | — | — | — | — |
| Stiffness (Nm/rad) | 218 | — | 325 | — | 1407 | 439 | 1193 | 361 | 433 | 642 | 795 | 202 |
| Static Damping | 2.22 | — | 1.59 | — | 2.36 | 1.99 | 1.77 | 1.67 | 1.54 | 1.67 | 1.59 | 1.68 |

Figure 9:
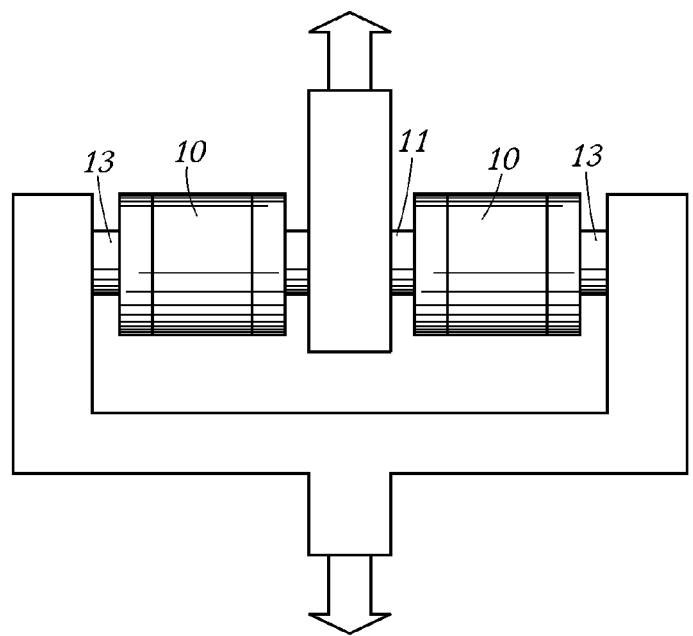
FIG. 9 is a schematic of a test method for a misalignment performance characteristic of the invention.

A test for the performance under various degrees of misalignment is shown schematically in FIG. 9. Two couplings 10 with an intermediate shaft 11 are connected to two fixed shafts 13. The intermediate shaft 11 is displaced at 2 mm/minute and at 23° C. ambient temperature. The load required to displace the shaft indicates the flexibility of the coupling sleeve under misalignment conditions. The misalignment which resulted in a load of about 500 N was taken as an indication of a misalignment limit for the coupling. This test was conducted on Comp. Ex. 1 and 3 and Ex. 12. Comp. Ex. 1 and 3 exhibited a misalignment limit of about 1 mm. Ex. 12 exhibited a misalignment limit of about 0.4 mm. Thus, an inventive coupling may have somewhat less misalignment flexibility than the prior art couplings. However, it is believed that over the broad range of design parameters available within the scope of the invention, comparable misalignment performance to prior art devices can be achieved if necessary for example by increasing the dimensions of one or more of gaps 60, 62, and 66.

Figure 10:
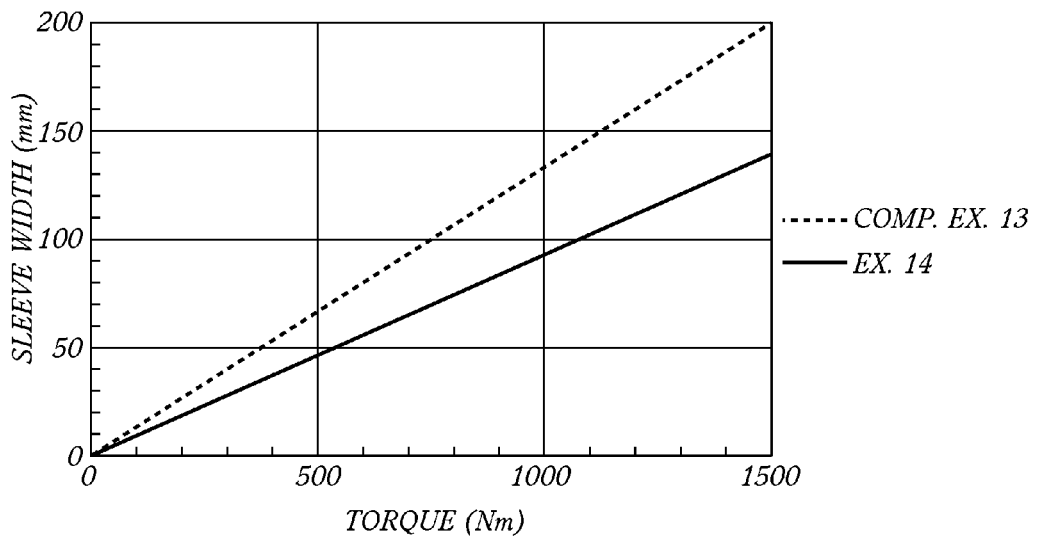
FIG. 10 is a graph illustrating a relationship between sleeve width and torque capacity for an embodiment of the invention.

Analysis was carried out to show the advantage of having a dual tooth profile over a single tooth profile. For this test, two couplings were analyzed, both having 111-mm-OD end pieces, 11 prongs and having a single groove in each prong. Ex. 13 had a single, eight-mm-pitch tooth profile on the sleeve and matching grooves and gaps on the prongs. Ex. 14 had a dual-tooth profile, i.e. larger groove teeth and smaller gap teeth on the sleeve, and with matching grooves and gap profiles on and between the prongs. The results of nominal torque load testing for these two embodiments are plotted in FIG. 10 as in terms of the width necessary to achieve a certain torque rating. The results show that the dual-tooth profile, Ex. 14, requires 30% less width to achieve the same torque rating as an equivalent coupling with only a single uniform tooth profile, Ex. 13. It may also be noted that FIG. 10 illustrates the increased torque capacity to be expected from increasing the sleeve width in the present invention.

Figure 11:
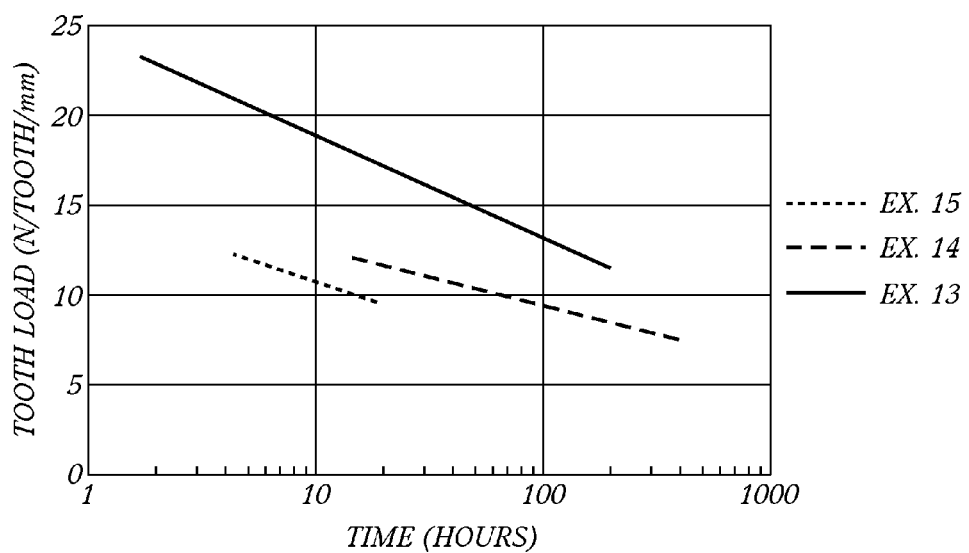
FIG. 11 is a graph illustrating relationships between tooth load and coupling life for embodiments of the invention.

A comparison test was carried out to show the advantage of increasing the number of prongs and decreasing the number of teeth in mesh ("TIM") or number of grooves on each prong, or equivalently the ratio of groove teeth to gap teeth in the sleeve. Several inventive couplings, listed in Table 2 as Ex. 15-17, were tested at various oscillating loads to see how long they would run. The results are plotted in FIG. 11. Note that the line for Ex. 16 includes both couplings with 40 teeth total and 4 prongs per end piece, and couplings with 50 teeth and 5 prongs. Also note that for all couplings there is one gap tooth per gap. Thus, the total number of teeth in the sleeve may be calculated as 2×(TIM+1)×number of prongs per end piece. It can be seen that the couplings with fewer teeth in mesh have a greater tooth load capacity. This is believed to occur because with many teeth in mesh on a prong, the load is not evenly carried by all the teeth. Instead, the first few teeth probably carry much higher loads than the last few teeth on the driven prongs, and vice versa on the driver prongs. On the other hand, with only one or two TIM, the load is spread very evenly over all the groove teeth. In addition, the ratio of teeth in compression to teeth in shear is much higher when there are only one or two TIM, leading to more effective load sharing by compressive sections of the sleeve.

TABLE 2

|  | Ex. 15 | Ex. 16 | Ex. 17 |
| --- | --- | --- | --- |
| Number of Teeth | 60 | 40 or 50 | 60 |
| Number of Prongs | 3 | 4 or 5 | 10 |
| Number of TIM | 9 | 4 | 2 |

Other design variations are also possible within the scope of the present invention. Some non-limiting examples are mentioned. An outer band may be used around the flexible sleeve to further reduce any tendency of the sleeve to jump teeth under high loads or to expand at high rpm operation. Various belt profiles may be formed in the support member or flange of the end piece or pieces so that the end piece may also function as a pulley in a power transmission belt drive system. A coupling system may include two couplings and an intermediate shaft, as illustrated in the test device of FIG. 9.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A flexible shaft coupling comprising:
   an annular sleeve,
   a driver end piece, and
   a driven end piece;
      wherein said annular sleeve, said driver end piece and said driven end piece are substantially coaxial;
   said annular sleeve comprising:
      a plurality of axially extending teeth on its inner periphery including:
         a plurality of groove teeth and
         a plurality of gap teeth
         arranged so that a number comprising one or more of groove teeth alternate with a single gap tooth; and
      with the groove teeth different from the gap teeth in at least one characteristic selected from size, profile, and shape.

2. The shaft coupling of claim 1 wherein said groove teeth are larger than said gap teeth.

3. The shaft coupling of claim 1 wherein said number is in the range of from one to nine.

4. The shaft coupling of claim 1 wherein said number is one or two.

5. The shaft coupling of claim 1 wherein said number is one.

6. The shaft coupling of claim 1 wherein said sleeve fits snugly around the periphery of said end pieces.

7. The shaft coupling of claim 6 wherein said end pieces comprise a plurality of loosely interlocked prongs.

* * * * *